(12) United States Patent
Sharony et al.

(10) Patent No.: US 6,735,445 B2
(45) Date of Patent: May 11, 2004

(54) SYSTEM AND METHOD FOR MEDIUM ACCESS CONTROL IN A WIRELESS NETWORK

(75) Inventors: Jacob Sharony, Dix Hills, NY (US); Joseph Katz, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 4 days.

(21) Appl. No.: 10/227,683

(22) Filed: Aug. 26, 2002

(65) Prior Publication Data

US 2004/0038695 A1 Feb. 26, 2004

(51) Int. Cl.[7] .............................. H04B 7/00; H04Q 7/20
(52) U.S. Cl. .................. 455/517; 455/63.4; 455/562.1; 370/338
(58) Field of Search ........................ 455/403, 435.1, 455/450, 453, 500, 509, 516, 517, 560, 561, 562, 25, 445, 452.1, 63.4; 370/338, 349, 341, 351, 310

(56) References Cited

U.S. PATENT DOCUMENTS

2002/0181427 A1 * 12/2002 Sparr et al. ............... 370/338
2003/0152086 A1 * 8/2003 El Batt ....................... 370/400
2003/0169769 A1 * 9/2003 Ho et al. .................... 370/473

* cited by examiner

Primary Examiner—Nay Maung
Assistant Examiner—Edan Orgad
(74) Attorney, Agent, or Firm—Fay Kaplun & Marcin, LLP

(57) ABSTRACT

Described is a method and system for an access control in a communication network which includes a first wireless unit, a second wireless unit and at least one further unit. The first unit generates a frame for the second unit. The frame includes a first portion and a second portion. The first portion includes data indicating that the first unit is about to establish a direct communication channel with the second unit. The first portion is transmitted to the second unit and is received by the at least one further wireless unit. The direct communication channel is established between the first unit and the second unit for transmission the second portion. During the transmission of the second portion, the at least one further unit abstains from communications using the direct communication channel.

20 Claims, 3 Drawing Sheets

US 6,735,445 B2

SYSTEM AND METHOD FOR MEDIUM ACCESS CONTROL IN A WIRELESS NETWORK

BACKGROUND OF THE INVENTION

The proliferation of conventional wireless and computing devices in the recent past has been exceptional. These devices are capable of exchanging data and/or voice signals among each other and/or with a central location using radio waves over dedicated frequencies or dedicated segments of the electromagnetic spectrum. The speed and range of these wireless communications is limited by, among other things, interference and power limitations. There is an ongoing effort to overcome these issues and to make these wireless communications as fast as their wired cousins and to increase their effective range.

One of the ways to overcome the above mentioned issues is by utilizing smart antennas ("SAs"). Deploying the SAs in communication systems has several known benefits, e.g., extended range, higher capacity, interference mitigation, lower power, etc. When using the SAs in conjunction with multiple access wireless networks (e.g., IEEE 802.11b wireless standard) some form of collision avoidance is required. For example, when there is a directed-beam transmission to a target mobile unit ("MU"), it may not be heard by a neighboring MU. The neighboring MU then would mistakenly assume that the radio frequency or channel is free and attempt to access it, thereby, causing a collision with an ongoing transmission. One possible solution for this problem is to use the built-in Request to Send/Clear to Send ("RTS/CTS") mechanism as described in the 802.11 standard. The RTS/CTS mechanism provides for a four-way handshake that results in higher overhead (e.g., two extra portions required to transmit one payload). There is a need for a system and method to eliminate this overhead without transmitting additional portions.

SUMMARY OF THE INVENTION

The present invention relates to a method and system for access control in a communication network which includes a first wireless unit, a second wireless unit and at least one further unit. The first unit generates a frame for the second unit. The frame includes a first portion and a second portion. The first portion includes data indicating that the first unit is about to establish a direct communication channel with the second unit. The first portion is transmitted to the second unit and is received by the at least one further wireless unit.

A direct communication channel is established between the first unit and the second unit for transmission of the second portion. During the transmission of the second portion, the at least one further unit abstains from communications using the direct communication channel.

DETAILED DESCRIPTION

The present invention relates to a method and system for medium access control ("MAC") in a wireless communication network that employs smart antennas ("SAs").

Generally, it is highly desirable to employ the SA to improve the range and speed of the wireless network. Unfortunately, this comes at the expense of causing problems with the standard MAC protocol known as Carrier Sense Multiple Access—Collision Avoidance ("CSMA-CA").

In particular, the CSMA-CA protocol requires that before initiating any communications on the wireless network a mobile unit ("MU") or an access point ("AP") must check for any activity on a communication channel. When the MU or the AP employs the SAs to direct their transmissions, it is possible that other MUs or APs may not detect the transmission and thus may cause interference on the communication channel. The present invention resolves this problem, as described in detail below, by employing a split frame that initially transmits, in an omni-directional beam pattern, a header portion of the frame for informing other wireless units to abstain from communications using the communication channel. Then, the SA changes to a directed beam focused on the target MU and transmits the data via the communication channel.

Figure 1:
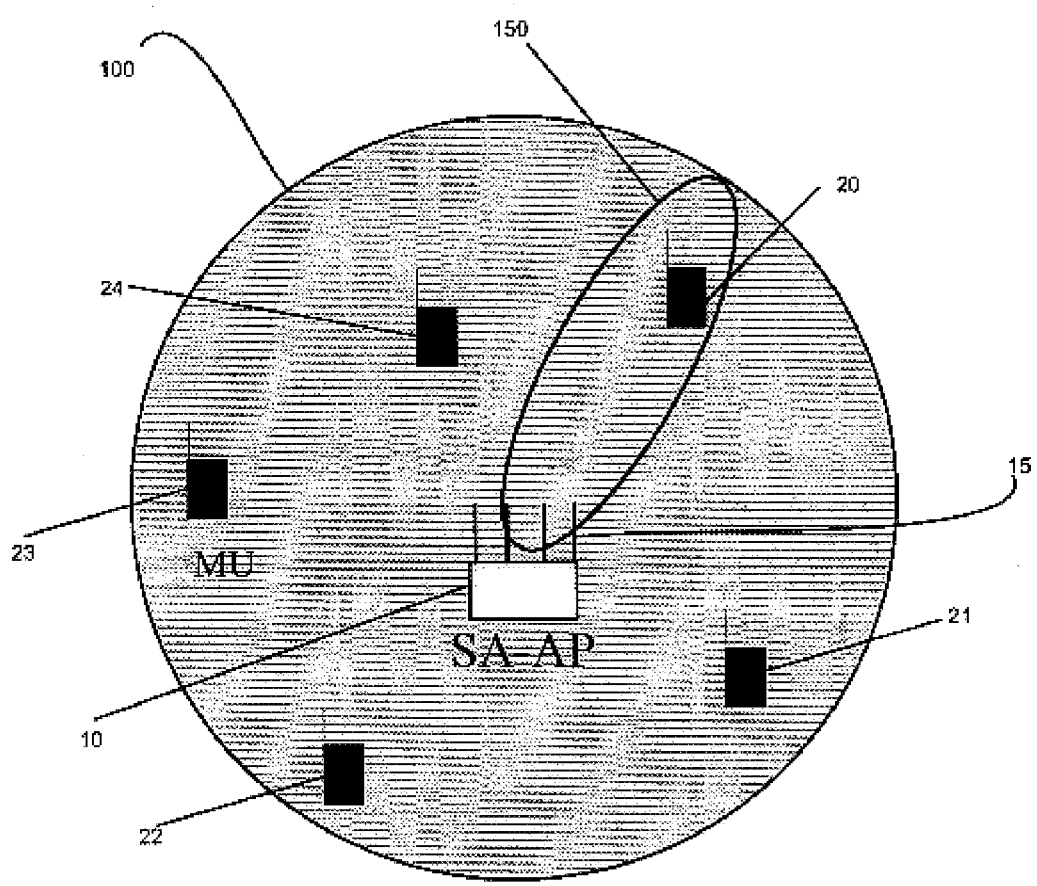
FIG. 1 shows an exemplary embodiment of a wireless network according to the present invention.

FIG. 1 shows an exemplary embodiment of a wireless network 1, e.g., a 802.11 wireless network. The wireless network 1 may include a plurality of wireless communication devices (e.g., MUs 20–24) and a plurality of access points (e.g., AP 10). All of the MUs 20–24 may be within the omni-directional coverage area 100 of the AP 10, while the target MU 20 may also be within a directed beam 150 of the SA 15.

The MUs 20-24 may be a conventional computing arrangement (e.g., a desktop or laptop computers, PDAs, cell phones, two-way pagers, etc.) which includes a wireless communication arrangement (e.g., a wireless modem, transmitter, etc.). The AP 10 may be a wireless router or a transceiver box that provides access for the MUs 20–24 to the wireless and wired network 1. The SA 15 combines a specialized array of many small antennas with a digital signal processor ("DSP"). The DSP can determine the optimal beam pattern to transmit and/or receive a signal. Depending on the sophistication of the SA system, the DSP may then switch to the optimal antenna or use the antenna array to actually shape a specific antenna pattern. This may be a directional beam 150 that the SA 15 creates when a payload portion 44 of a frame 40 (FIG. 3) is sent.

When the SA 15 transmits data packets in the omni directional coverage area 100, it shapes the beam to cover all directions (i.e., 360 degrees) with an equally powered signal. It is also possible that the maximal or intended coverage area of the AP 10 is not circular, for example, the AP 10 is stationed in the corner of a building or in a valley. In such cases the beam may be adjusted for the geography of a particular network.

Figure 2:
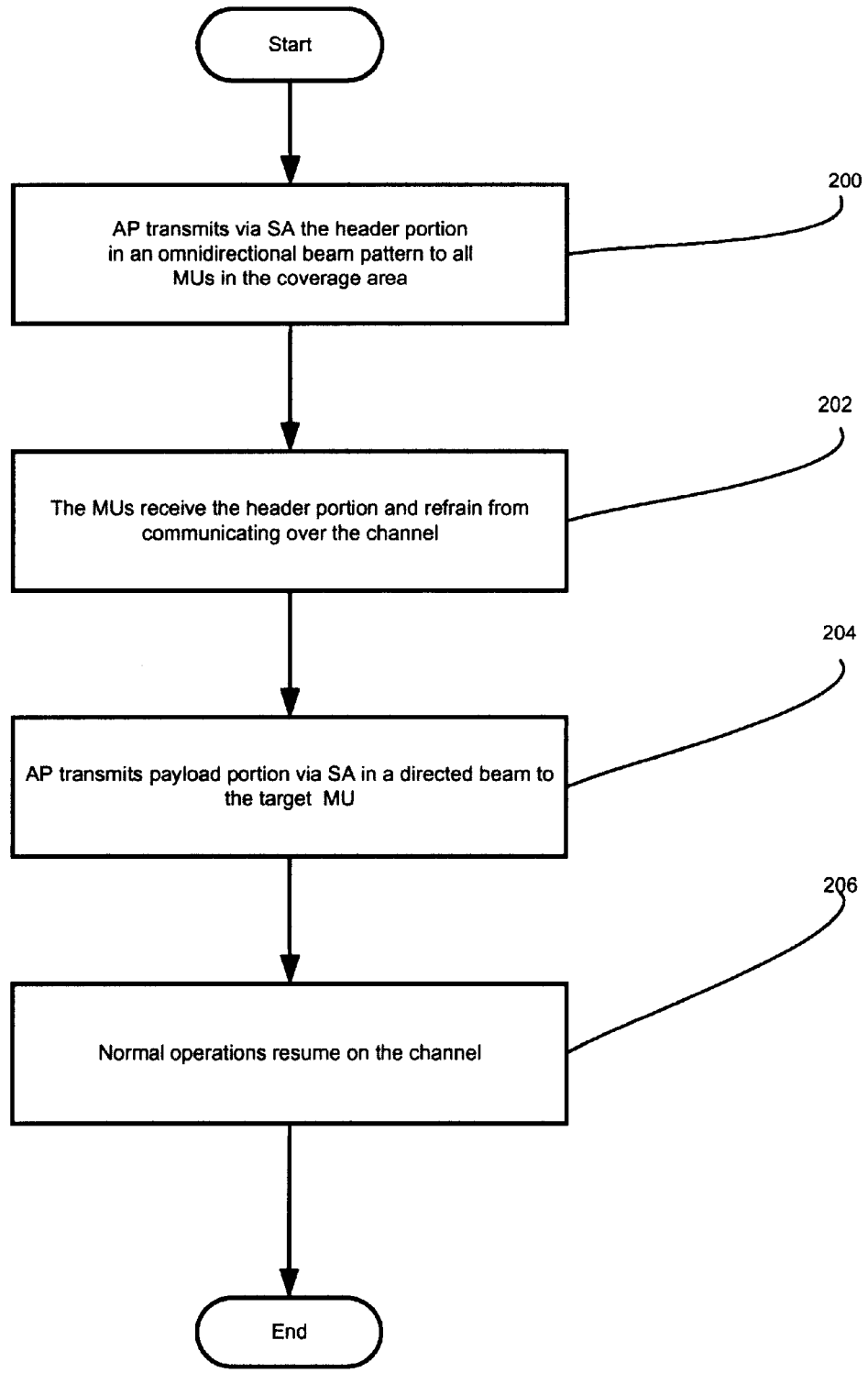
FIG. 2 shows an exemplary method according to the present invention.

FIG. 2 shows a method according to an exemplary embodiment of the present invention. The method is described with reference to FIGS. 1 and 3. Other configurations with different numbers of MUs equipped or not equipped with SAs, and APs equipped or not equipped with SAs, may also be used.

Figure 3:
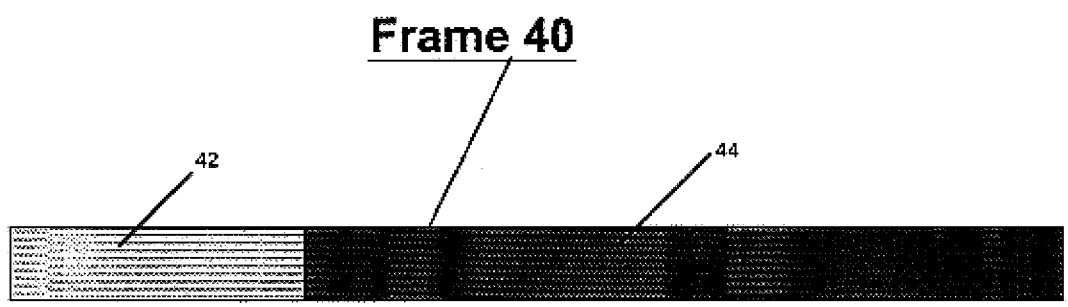
FIG. 3 shows an exemplary embodiment of a frame.

FIG. 3 shows an exemplary embodiment of a frame 40 used for MAC and data transfers. The frame 40 may include two portions: a header portion 42 and a payload portion 44. The header portion 42 may include data necessary for MAC and be transmitted in the omni-directional coverage area 100 by the SA 15 to a particular MU (e.g., the MU 20). Although the header portion 42 is transmitted to the MU 20, other MUs 21–24 may "hear" the header portion 42. The payload portion 44 may include a plurality of data packets storing data specifically designated for the target MU 20 and is transmitted using the directional beam 150.

The MAC process is initiated in step 200 with the AP 10 transmitting the header portion 42. The SA 15 transmits the header portion 42 in the omni-directional coverage area 100 so that the MU 20 may receive it. The header portion 42 is transmitted at a particular rate (e.g., a "common denominator" rate) which is acceptable by most devices of the wireless network 1. The particular data rate may be the lowest data rate supported by the wireless network 1 so that all other MUs may receive the header portion 42.

For example, in order for the AP 10 to provide an optimal transmission performance (i.e., balancing throughput and coverage) multiple data rates may be used in the wireless network 1. If the MU 20 is close to the AP 10, a higher data rate and a lower transmission power may be used to most efficiently transmit the data in the shortest amount of time. When the MUs 20–24 are farther from the AP 10, the AP 10 is unable to communicate at the higher data rate and the lower transmission power. In order to provide greater coverage, the AP 10 may communicate at a lower data rate and higher power to assure that all the MUs 20–24 may receive and process the header portion 42.

The far reaching transmission of the header portion 42 may provide an added benefit. Any MUs not in the wireless network 1, but rather in adjacent wireless networks may also participate in the following steps. This further reduces interference in the transmission of the payload portion 44.

In step 202, the MUs 20–24 receive the header portion 42. The header portion 42 may include data for the MUs 21–24 indicating that the communication channel is being utilized by the AP 10 to communicate with the MU 20. The header portion 42 may also include information such as data rate and packet length or any other information that may be used by the MUs 21–24 to determine the time length of the communication. During this time period the MUs 21–24 refrain from using the communication channel even if they do not detect any activity. Thus, the MUs 21–24 avoid the possibility of colliding with any communications between the AP 10 and the MU 20.

In step 204, the AP 10 sends the payload portion 44 of the frame 40 to the MU 20. The SA 15 transmits the payload portion 44 using the directional beam 150. The payload portion 44 is delivered within the period of time specified in the header portion 42; otherwise, the payload portion 44 may collide with transmissions from the MUs 21–24 because they do not detect that the communication channel is still in use.

In step 206, the reservation period specified by the header portion 42 has expired, and normal operations on the communication channel resume. Normal operations may include the MUs 20–24 and the APs 10 using the CSMA-CA MAC in conjunction with the present invention. The system may also use the present invention as the exclusive method of MAC in conjunction with a collision detection and correction scheme.

The present invention has been described with reference to an embodiment having five MUs and one AP. However, other embodiments may be devised having additional APs and/or additional or fewer MUs. The AP and one of the MUs may even be interchanged in the MAC process. In addition, those skilled in the art will understand that the present invention may work for both communications between the AP 10 and the MUs 20–24 (i.e., from the AP 10 to a particular MU and from a particular MU to the AP 10). Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A method for an access control in a communication network including a first wireless unit, a second wireless unit and at least one further unit, the method comprising the steps of:
   generating, by the first unit, a frame for the second unit, the frame including a first portion and a second portion, the first portion including data indicating that the first unit is establishing a direct communication channel with the second unit;
   transmitting the first portion to the second unit, the first portion being received by the at least one further wireless unit; and
   establishing the direct communication channel between the first unit and the second unit to transmit the second portion,
   wherein during transmission of the second portion, the at least one further unit abstains from communications using the direct communication channel.

2. The method according to claim 1, wherein the first unit is a wireless access point having a smart antenna, the second unit and the at least one further units being wireless mobile units.

3. The method according to claim 2, wherein the access point and the mobile units communicate using an 802.11 communication protocol.

4. The method according to claim 1, wherein the first unit and the at least one further units are wireless mobile units, the second unit being a wireless access point, the first having a smart antenna.

5. The method according to claim 1, wherein the first unit transmits the first portion over a first area covering the entire communication network.

6. The method according to claim 5, wherein the first unit includes a smart antenna, the second portion being transmitted, using the smart antenna, within a second area of the first area, the second area being an area covered by the smart antenna.

7. The method according to claim 6, wherein the first portion is transmitted at a first transmission rate and the second portion is transmitted at a second transmission rate, the second transmission rate being higher than the first transmission rate.

8. The method according to claim 7, wherein the first rate is a rate at which the second unit and the at least one further unit are capable of receiving the first portion.

9. The method according to claim 1, wherein the first portion includes data indicative of a particular time period for transmitting the second portion, the at least one further unit abstains from utilizing the directional channel during the particular time period.

10. The method according to claim 1, further comprising the step of:
    resuming utilization of the direct channel by the at least one further unit after transmission of the second portion.

11. A system, comprising:
    a first wireless unit;
    a second wireless unit; and
    at least one further unit,
    wherein the first unit generates a frame for the second unit, the frame including a first portion and a second portion, the first portion including data indicating that the first unit is about to establish a direct communication channel with the second unit, wherein the first unit transmits the first portion to the second unit, the first portion being received by the at least one further unit, wherein the first and second units establish the direct communication channel to transmit the second portion, wherein during transmission of the second portion, the at least one further unit abstains from communications using the direct communication channel.

12. The system according to claim 11, wherein the first unit is a wireless access point having a smart antenna, the second unit and the at least one further units being wireless mobile units.

13. The system according to claim 12, wherein the access point and the mobile units communicating using an 802.11 communication protocol.

14. The system according to claim 11, wherein the first unit and the at least one further unit are wireless mobile units, the second unit being a wireless access point, the first unit having a smart antenna.

15. The system according to claim 11, wherein the first unit transmits the first portion to a first area covering the entire communication network.

16. The system according to claim 13, wherein the first unit includes a smart antenna, the second portion being transmitted, using the smart antenna, within a second area of the first area, the second area being an area covered by the smart antenna.

17. The system according to claim 14, wherein the first portion is transmitted at a first transmission rate and the second portion is transmitted at a second transmission rate, the second transmission rate being higher then the first transmission rate.

18. The system according to claim 15, wherein the first rate is a rate at which the second unit and the at least one further unit are capable of receiving the first portion.

19. The system according to claim 11, wherein the first portion includes data indicative of a particular time period for transmitting the second portion, the at least one further unit abstains from utilization the directional channel during the particular time period.

20. The system according to claim 11, wherein the at least one further unit resumes utilization of the direct channel by after transmission of the second portion.

* * * * *